(12) United States Patent
Yang et al.

(10) Patent No.: US 11,099,900 B2
(45) Date of Patent: Aug. 24, 2021

(54) MEMORY RECLAMATION METHOD AND APPARATUS

(71) Applicant: Huawei Technologies Co., Ltd., Shenzhen (CN)

(72) Inventors: Qibin Yang, Hangzhou (CN); Xiaojun Duan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 16/365,082

(22) Filed: Mar. 26, 2019

(65) Prior Publication Data

US 2019/0220318 A1 Jul. 18, 2019

Related U.S. Application Data

(63) Continuation of application No. PCT/CN2017/092744, filed on Jul. 13, 2017.

(30) Foreign Application Priority Data

Sep. 27, 2016 (CN) .......................... 201610855624.0

(51) Int. Cl.
*G06F 9/46* (2006.01)
*G06F 9/50* (2006.01)
(Continued)

(52) U.S. Cl.
CPC ............ *G06F 9/5022* (2013.01); *G06F 9/445* (2013.01); *G06F 12/02* (2013.01); *G06F 12/023* (2013.01)

(58) Field of Classification Search
CPC ........ G06F 9/5022; G06F 9/445; G06F 12/02; G06F 12/023
See application file for complete search history.

(56) References Cited

U.S. PATENT DOCUMENTS 6,453,403 B1 9/2002 Czajkowski
2009/0044191 A1 2/2009 Chai et al.
(Continued)

FOREIGN PATENT DOCUMENTS

CN 101009583 A 8/2007
CN 101344861 A 1/2009
(Continued)

OTHER PUBLICATIONS

Foreign Communication From a Counterpart Application, European Application No. 17854530.7, Extended European Search Report dated Sep. 17, 2019, 8 pages.
(Continued)

*Primary Examiner* — Tammy E Lee
(74) *Attorney, Agent, or Firm* — Conley Rose, P.C.

(57) ABSTRACT

A memory reclamation method and apparatus, where the method includes determining a target process from a background process list when current available memory of a system is less than a memory threshold, where the background process list includes a process of one or more applications, the target process is a process among the process of the one or more applications meeting a condition that an absolute value of a difference between memory occupied by the process and a memory pressure value is less than a preset threshold, and the memory pressure value is a difference between the memory threshold and the current available memory of the system, and sending a processing instruction to a system kernel to trigger the system kernel to reclaim the memory occupied by the target process.

20 Claims, 8 Drawing Sheets

(51) Int. Cl.
*G06F 9/445* (2018.01)
*G06F 12/02* (2006.01)

(56) References Cited

U.S. PATENT DOCUMENTS

| | | | |
|---|---|---|---|
| 2010/0250868 A1* | 9/2010 | Oshins | G06F 9/45558 711/154 |
| 2012/0179882 A1* | 7/2012 | Bernhard, III | G06F 9/5022 711/156 |
| 2012/0180061 A1* | 7/2012 | Rao | G06F 9/5088 718/104 |
| 2012/0324199 A1 | 12/2012 | Yamashita et al. | |
| 2013/0332942 A1* | 12/2013 | Ramesh | G06F 9/542 719/318 |
| 2015/0026428 A1 | 1/2015 | Bobroff et al. | |
| 2015/0089101 A1* | 3/2015 | Tsirkin | G06F 13/24 710/262 |
| 2015/0347181 A1* | 12/2015 | Myrick | G06F 12/02 718/102 |
| 2016/0062700 A1 | 3/2016 | Liu et al. | |
| 2017/0285977 A1* | 10/2017 | Zhou | G06F 3/0673 |
| 2018/0307600 A1 | 10/2018 | Wang et al. | |

FOREIGN PATENT DOCUMENTS

| | | |
|---|---|---|
| CN | 101770385 A | 7/2010 |
| CN | 101833512 A | 9/2010 |
| CN | 102253900 A | 11/2011 |
| CN | 101908022 B | 3/2012 |
| CN | 101859279 B | 5/2012 |
| CN | 102984580 A | 3/2013 |
| CN | 103024190 A | 4/2013 |
| CN | 103024539 A | 4/2013 |
| CN | 103345397 A | 10/2013 |
| CN | 103631661 A | 3/2014 |
| CN | 104461737 A | 3/2015 |
| CN | 104484282 A | 4/2015 |
| CN | 104679666 A | 6/2015 |
| CN | 104820545 A | 8/2015 |
| CN | 105335099 A | 2/2016 |
| CN | 105373485 A | 3/2016 |
| CN | 105511963 A | 4/2016 |
| CN | 105701025 A | 6/2016 |
| CN | 105824702 A | 8/2016 |
| KR | 20020063459 A | 8/2002 |
| WO | 2011058768 A1 | 5/2011 |

OTHER PUBLICATIONS

Machine Translation and Abstract of Chinese Publication No. CN101344861, Jan. 14, 2009, 12 pages.
Machine Translation and Abstract of Chinese Publication No. CN101770385, Jul. 7, 2010, 9 pages.
Machine Translation and Abstract of Chinese Publication No. CN101833512, Sep. 15, 2010, 11 pages.
Machine Translation and Abstract of Chinese Publication No. CN101859279, May 9, 2012, 13 pages.
Machine Translation and Abstract of Chinese Publication No. CN101908022, Mar. 28, 2012, 12 pages.
Machine Translation and Abstract of Chinese Publication No. CN102253900, Nov. 23, 2011, 9 pages.
Machine Translation and Abstract of Chinese Publication No. CN102984580, Mar. 20, 2013, 22 pages.
Machine Translation and Abstract of Chinese Publication No. CN103024190, Apr. 3, 2013, 12 pages.
Machine Translation and Abstract of Chinese Publication No. CN103631661, Mar. 12, 2014, 20 pages.
Machine Translation and Abstract of Chinese Publication No. CN104461737, Mar. 25, 2015, 16 pages.
Machine Translation and Abstract of Chinese Publication No. CN104484282, Apr. 1, 2015, 11 pages.
Machine Translation and Abstract of Chinese Publication No. CN104679666, Jun. 3, 2015, 7 pages.
Machine Translation and Abstract of Chinese Publication No. CN104820545, Aug. 5, 2015, 22 pages.
Machine Translation and Abstract of Chinese Publication No. CN105335099, Feb. 17, 2016, 32 pages.
Machine Translation and Abstract of Chinese Publication No. CN105511963, Apr. 20, 2016, 10 pages.
Machine Translation and Abstract of Chinese Publication No. CN105824702, Aug. 3, 2016, 18 pages.
Foreign Communication From a Counterpart Application, Chinese Application No. 201610855624.0, Chinese Search Report dated Dec. 28, 2017, 6 pages.
Foreign Communication From a Counterpart Application, PCT Application No. PCT/CN2017/092744, English Translation of International Search Report dated Sep. 15, 2017, 2 pages.
Foreign Communication From a Counterpart Application, PCT Application No. PCT/CN2017/092744, English Translation of Written Opinion dated Sep. 15, 2017, 4 pages.
Kim, S., et al., "SmartLMK: A Memory Reclamation Scheme for Improving User-Perceived App Launch Time," ACM Transactions on Embedded Computing Systems, May 2016, Article No. 47, 25 pages.

* cited by examiner

MEMORY RECLAMATION METHOD AND APPARATUS

CROSS-REFERENCE TO RELATED APPLICATIONS

This application is a continuation of International Patent Application No. PCT/CN2017/092744 filed on Jul. 13, 2017, which claims priority to Chinese Patent Application No. 201610855624.0 filed on Sep. 27, 2016. The disclosures of the aforementioned applications are hereby incorporated by reference in their entireties.

TECHNICAL FIELD

The present disclosure relates to the field of information technologies, and in particular, to a memory reclamation method and apparatus.

BACKGROUND

With development of terminals, such as smartphones and tablet computers, terminals have become indispensable items in people's daily lives. In practice, it is found that, when a user has just purchased a terminal, the user uses the terminal very smoothly, and applications run very fast. After the terminal is used for a long time, as increasing applications are installed, many useless processes and services are running in the background, and excessive data is cached when the user browses web pages and uses application programs (also referred to as APPs). These reduce available memory of a system and cause intermittent stops to the terminal.

A usual practice is to check whether the system has sufficient available memory when the system allocates memory. If current available memory of the system cannot support a current memory allocation requirement, a system memory cleanup operation is started, for example, reclaiming system cache or stopping a process. However, as a result of this, an application requiring a memory resource is to be blocked in a waiting state, prolonging a response time of the app and thereby increasing a probability of intermittent stops of the terminal.

SUMMARY

Embodiments of the present disclosure provide a memory reclamation method and apparatus in order to reduce a probability of intermittent stops of a terminal.

A first aspect of the embodiments of the present disclosure discloses a memory reclamation method, including determining a process for which memory is to be reclaimed from a background process list when current available memory of a system is less than a memory threshold, where the background process list includes a process of one or more applications, the process for which memory is to be reclaimed is a process that is among the process of the one or more applications and that meets a condition that an absolute value of a difference between memory occupied by the process and a memory pressure value is less than a preset threshold, and the memory pressure value is a difference between the memory threshold and the current available memory of the system, and sending a processing instruction to a system kernel, to trigger the system kernel to perform processing on the process for which memory is to be reclaimed in order to reclaim the memory occupied by the process for which memory is to be reclaimed.

The steps of the foregoing method may be performed by one or more memory control threads, one or more memory control processes, or an application.

The background process list is a dynamic bidimensional list that is sorted based on an application importance degree and a process priority, and that includes a process of one or more applications. That is, the background process list may include one or more applications, and one application may include one or more processes. The background process list is created in two cases. A first case is that the background process list is created when the current available memory of the system is less than the memory threshold. Generally, this case is applicable to scenarios in which memory reclamation needs to be performed immediately. A second case is that the background process list is created when the current available memory of the system is less than the memory threshold and that the system is in an idle state. Generally, this case is applicable when a user is interacting with a terminal and memory reclamation needs to be performed when the system is idle to avoid affecting user experience.

Further, in this embodiment of the present disclosure, when the current available memory of the system is less than the memory threshold, a memory reclamation policy may be formulated, and the process for which memory is to be reclaimed is determined from the background process list based on the memory reclamation policy. Further, the processing instruction is sent to the system kernel, to trigger the system kernel to perform processing on the process for which memory is to be reclaimed in order to reclaim the memory corresponding to the process for which memory is to be reclaimed, until a current memory pressure of the system is relieved.

In addition, various relations exist between applications. Therefore, when memory occupied by a background process is reclaimed, to prevent the cleared process from being pulled up by a related process, memory reclamation is performed using an application as a unit, and memory occupied by a process included in the application is reclaimed. Memory occupied by a process is memory exclusively occupied by the process, and does not include memory shared by the process and another process.

It can be learned that in this manner, when the current available memory of the system is less than the memory threshold, proactive memory reclamation may be performed. When an application program truly requires a large amount of memory, the system kernel has already reclaimed a large amount of available memory. Therefore, a probability of intermittent stops of the terminal can be reduced.

In a possible implementation, the operation of determining that current available memory of a system is less than a memory threshold is triggered when a first key event is detected, and the memory threshold is a first memory threshold corresponding to the first key event. The memory threshold may be statically preset, or may be dynamically configured. Different first key events correspond to different scenarios, and corresponding first memory thresholds are also different.

In a possible implementation, the first key event includes any one of a program start beginning event, a cleanup event, and an out of memory (OOM) event. When the first key event happens, memory reclamation needs to be performed immediately.

In a possible implementation, the operation of determining that current available memory of a system is less than a memory threshold is triggered when a second key event is detected and when the system is in an idle state, and the memory threshold is a second memory threshold corresponding to the second key event. The memory threshold may be statically preset, or may be dynamically configured. Different second key events correspond to different scenarios, and corresponding second memory thresholds are also different.

In this implementation, a time order of the steps are when the second key event is detected, it is determined whether the system is in an idle state, when the system is in an idle state, current available memory of a system is read, when the current available memory of the system is less than a memory threshold, a process for which memory is to be reclaimed is determined from a background process list, further, a processing instruction is sent to a system kernel to trigger the system kernel to perform processing on the process for which memory is to be reclaimed in order to reclaim the memory corresponding to the process for which memory is to be reclaimed.

In a possible implementation, the operation of determining that current available memory of a system is less than a memory threshold is triggered when a second key event is detected, the operation of determining a process for which memory is to be reclaimed from a background process list is triggered when the system is in an idle state, and the memory threshold is a second memory threshold corresponding to the second key event.

In this implementation, a time order of the steps are the current available memory of the system is read first when the second key event is detected, then when the current available memory of the system is less than the memory threshold, it is determined whether the system is in an idle state, and when the system is in an idle state, the process for which memory is to be reclaimed is determined from the background process list, and further, the processing instruction is sent to the system kernel to trigger the system kernel to perform processing on the process for which memory is to be reclaimed in order to reclaim the memory corresponding to the process for which memory is to be reclaimed.

In a possible implementation, the second key event includes any one of a program start completed event, a screen-on event, a screen-off event, a screen touch event, a user interface switch event, a task switch completed event, and a broadcast event.

In a possible implementation, determining that the system is in an idle state includes determining whether current load of the system is less than a load threshold, and when the current load of the system is less than the load threshold, determining that the system is in an idle state.

There are two scenarios in which the system is in an idle state. A first scenario is that the terminal is not being used by a user. For example, the terminal may be considered to be in an idle state when the terminal is in a standby state. For another example, when start of an application is completed and a display screen appears, but there is no interaction with the terminal afterwards, in this case, the system does not have a large quantity of input/output (TO) operations and may be considered to be in an idle state. A second scenario is that the system may be considered to be in an idle state when the terminal is being used by a user but current system load does not affect user experience, for example, when the system load is less than a load threshold.

In a possible implementation, when a plurality of processes for which memory is to be reclaimed are determined, sending a processing instruction to a system kernel includes calling a plurality of threads to send a plurality of processing instructions to the system kernel, where each thread is used to send one or more processing instructions.

There may be one or more processes determined for which memory is to be reclaimed. When one process requires sending a plurality of processing instructions, the processing instructions may be sent successively one by one for the process, without a need to check, after sending one processing instruction, a state of memory corresponding to the process for which memory is reclaimed by the system kernel before sending another processing instruction.

In this optional implementation, when a plurality of processes for which memory is to be reclaimed is determined, a plurality of threads may be called to send a plurality of processing instructions to the system kernel. Further, that one thread sends a plurality of processing instructions means that the thread sends the processing instructions successively one by one, without a need to check, after sending one processing instruction, the state of the memory corresponding to the process for which memory is reclaimed by the system kernel before sending another processing instruction. Each processing instruction carries an identifier of one to-be-reclaimed process.

It can be learned that this manner can increase efficiency of sending processing instructions to the system kernel by a thread, and can also improve memory reclamation performance of the system kernel.

In a possible implementation, determining a process for which memory is to be reclaimed from a background process list includes determining, based on ascending order of application importance degrees, at least one application from a plurality of applications included in the background process list, and determining, based on ascending order of process priorities, the process for which memory is to be reclaimed from processes included in the at least one application.

In a possible implementation, the method further includes creating the background process list when the current available memory of the system is less than the memory threshold. This case is applicable to scenarios in which memory reclamation needs to be performed immediately.

In a possible implementation, the method further includes creating the background process list when the current available memory of the system is less than the memory threshold and that the system is in an idle state. This case is applicable to a scenario in which a user is interacting with the terminal, and memory reclamation needs to be performed when the system is idle to avoid affecting user experience.

In a possible implementation, creating the background process list includes determining a score of a key element of each application that is currently running in the background, where the key element includes one or more of a process priority, a user use habit, a process-occupied system resource, and an application relation, performing weighted calculation on scores of all key elements of each application to obtain an importance degree of the application, sorting all applications based on importance degrees of all the applications, and sorting, based on process priorities, processes included in each sorted application to generate the background process list.

The system resource may include but is not limited to a computing resource, a storage resource, a central processing unit (CPU) resource, and an IO resource. When the background process list is created based on the key elements (the process priority, the user use habit, the process-occupied system resource, and the application relation) of the applications, a process that requires processing can be subsequently determined from the background process list based on a memory requirement. In this way, a killable process queue can be selected accurately, reducing a probability of mistaken/excessive/missed killing of processes.

A second aspect of the embodiments of the present disclosure discloses a memory reclamation apparatus, including functional units configured to perform some or all steps of any method in the first aspect of the embodiments of the present disclosure. When the terminal performs some or all steps of any method in the first aspect, the probability of intermittent stops of the terminal can be reduced.

A third aspect of the embodiments of the present disclosure discloses a terminal, including a processor and a memory, where the memory is configured to store an instruction, the processor is configured to execute the instruction, and the processor executes the instruction to perform some or all steps of any method in the first aspect of the embodiments of the present disclosure. When the terminal performs some or all steps of any method in the first aspect, the probability of intermittent stops of the terminal can be reduced.

A fourth aspect of the embodiments of the present disclosure discloses a computer storage medium, where the computer storage medium stores a program, and the program further includes an instruction used to perform some or all steps of any method in the first aspect of the embodiments of the present disclosure.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The terms "comprising," "including," or any other variant thereof mentioned in the specification, claims, and the accompanying drawings of the present disclosure, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present disclosure disclose a memory reclamation method and apparatus in order to reduce a probability of intermittent stops of a terminal. The following separately provides descriptions in detail.

The memory reclamation method provided by the embodiments of the present disclosure is mainly applied to a terminal. The terminal may be referred to as user equipment (UE), a mobile station (MS), a mobile terminal, or the like. Optionally, the terminal may have a capability of communicating with one or more core networks using a radio access network (RAN). For example, the terminal may be a mobile phone (also referred to as a "cellular" phone) or a computer with a mobile property. For example, the terminal may alternatively be a portable mobile apparatus, a pocket-sized mobile apparatus, a handheld mobile apparatus, a computer built-in mobile apparatus, or an in-vehicle mobile apparatus. An operating system of the terminal may include but is not limited to an ANDROID operating system, an IOS operating system, a SYMBIAN operating system, a BLACKBERRY operating system, the WINDOWS Phone 8 operating system, or the like.

The memory reclamation method provided by the embodiments of the present disclosure is mainly applied to a terminal with an ANDROID operating system.

For a better understanding of the embodiments of the present disclosure, the following first describes a schematic structural diagram of an operating system disclosed in an embodiment of the present disclosure.

Figure 1:
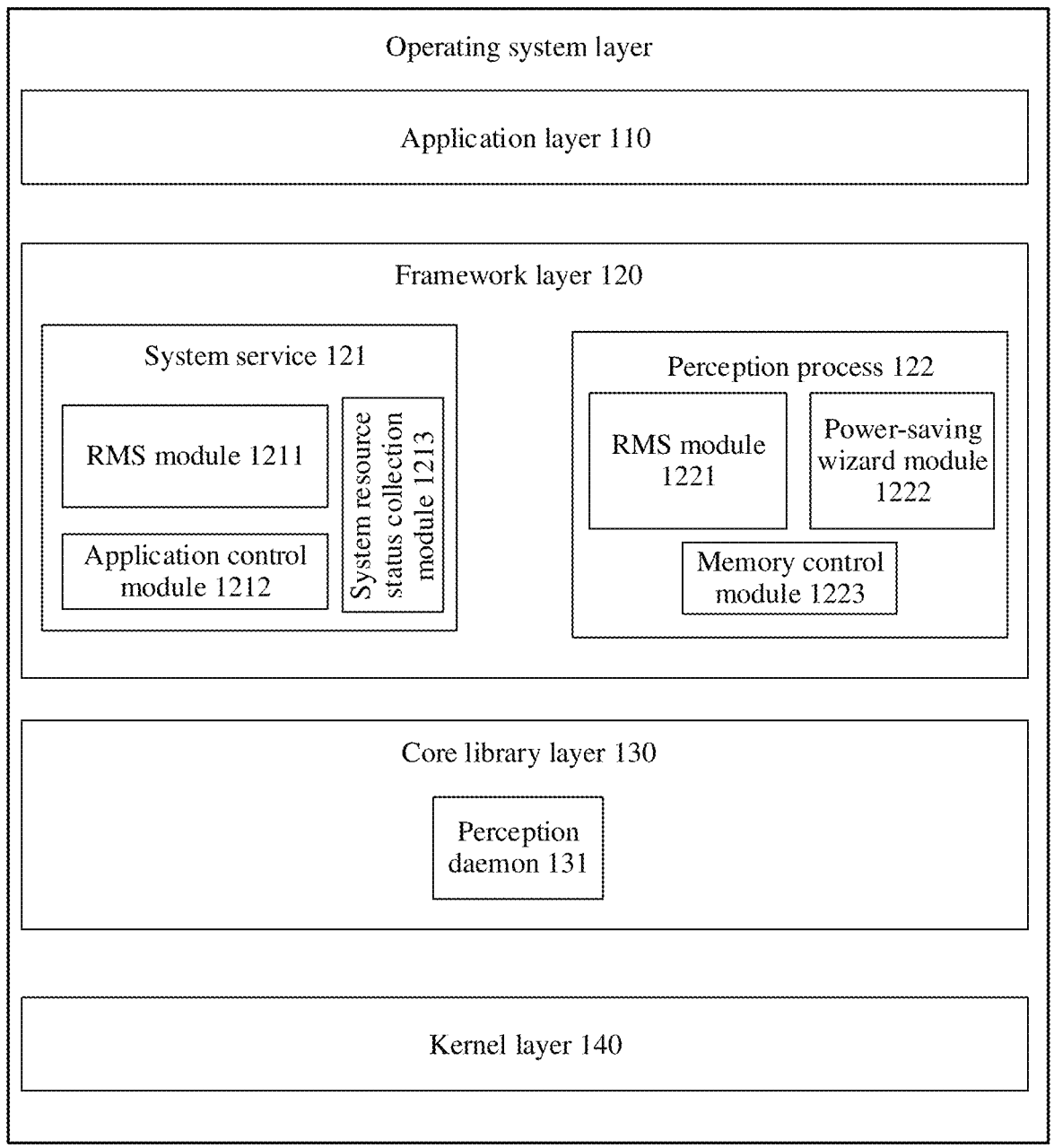
FIG. 1 is a schematic structural diagram of an operating system disclosed in an embodiment of the present disclosure.

Referring to FIG. 1, FIG. 1 is a schematic structural diagram of an operating system disclosed in an embodiment of the present disclosure. Further, the operating system may be an ANDROID operating system. The ANDROID operating system is an open source operating system developed by GOOGLE based on a LINUX platform. The ANDROID operating system is a layered environment built on a Linux kernel, and includes rich functions.

As shown in FIG. 1, the operating system includes an application layer 110, a framework layer 120, a core library layer 130, and a kernel layer 140.

The application layer 110 includes all application programs required when a terminal works, for example, an email client, a short message service, a calendar, a map, and a browser. These application programs may be written using a language such as JAVA or C/C++.

The framework layer 120 is an ANDROID application program framework, and ANDROID application programs are all developed based on the framework. The framework enables a developer to develop rich and novel application programs by providing a set of basic class libraries. Based on the class libraries, the developer may freely utilize a hardware advantage of a device to implement functions, for example, accessing location information, running a background service, setting an alarm clock, and adding a notification into a status bar. It should be noted that, the framework layer 120 shown in FIG. 1 retains functional modules of the original framework layer of the ANDROID operating system. In addition, some modifications are made to a system service 121. As shown in FIG. 1, the system service 121 includes a resource management system (RMS) module 1211, an application control module 1212, and a system resource status collection module 1213. The RMS module 1211 is mainly configured to manage information collected by the system resource status collection module 1213, the application control module 1212 is mainly configured for rapid processing of a process, and the system resource status collection module 1213 is mainly configured to collect and identify a system resource load status. In addition, as shown in FIG. 1, a perception process 122 is added into the framework layer 120. The perception process 122 includes an RMS module 1221, a power-saving wizard module 1222, and a memory control module 1223. The RMS module 1221 is mainly configured to process a memory control measure that takes a long implementation time and performs screen on/off identification. The power-saving wizard module 1222 is mainly configured to identify an application operating status and determine whether an amount of battery consumed by an application exceeds a battery threshold in order to perform control processing (for example, killing a process, restricting application start, or delaying message distribution). The memory control module 1223 is mainly configured to manage and process an external module interface, identify a system idle/load status, manage configuration of an idle memory threshold, identify a memory pressure status, formulate a refined memory reclamation policy, perform smart memory allocation, and manage maintenance and testing.

The core library layer 130 mainly provides the components of the framework layer 120 with a set of C/C++ libraries (underlying libraries for the application framework) for basic implementations of the components. The core library layer 130 includes a perception daemon 131, and the perception daemon 131 is mainly configured to collect system resource status information.

The kernel layer 140 is located at a bottom layer of the ANDROID operating system, and may be considered as a direct abstraction of a hardware layer and other software groups in the system. The kernel layer 140 mainly provides the ANDROID operating system with core system services, including a security mechanism, memory management, process management, file management, network communications management, and driver management. In addition, in this embodiment of the present disclosure, the kernel layer 140 may alternatively be configured for cache reclamation at a process level.

Figure 2A:
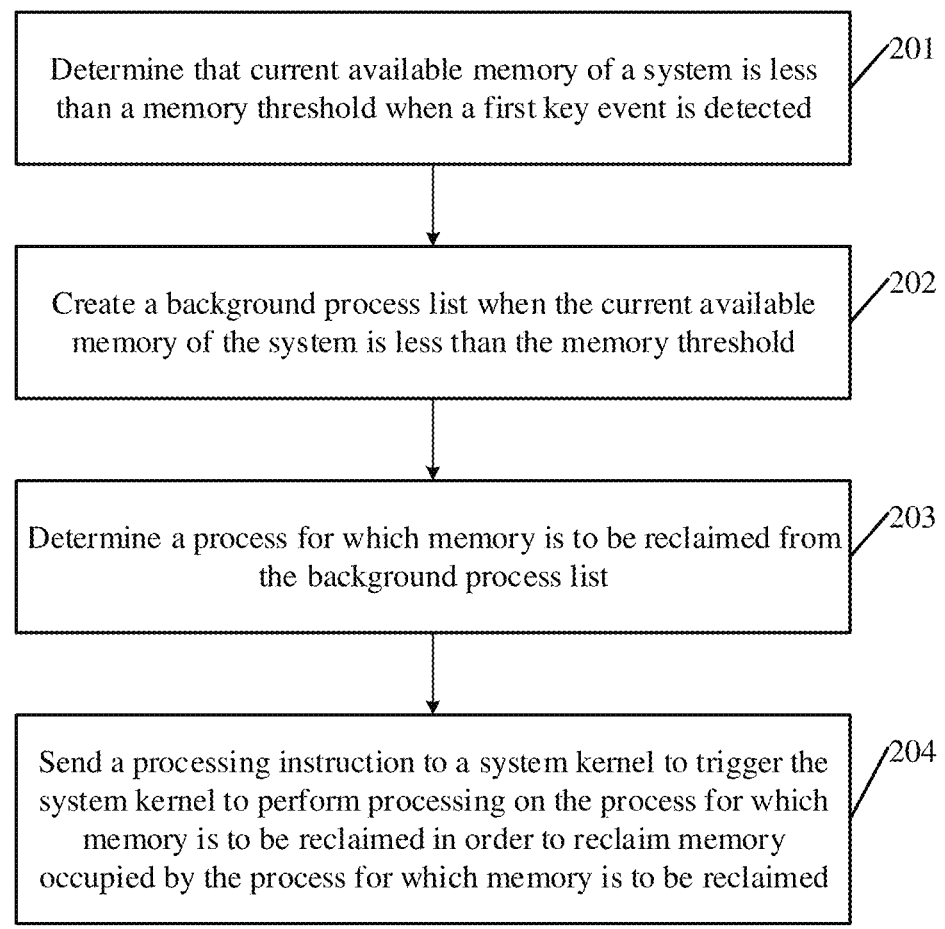
FIG. 2A is a schematic flowchart of a memory reclamation method disclosed in an embodiment of the present disclosure.

Referring to FIG. 2A, FIG. 2A is a schematic flowchart of a memory reclamation method disclosed in an embodiment of the present disclosure. The method may be applied to the memory control module 1223 shown in FIG. 1. Further, the memory control module 1223 may be one or more threads, or the memory control module 1223 may be one or more processes. As shown in FIG. 2A, the method may include the following steps.

Step 201: Determine that current available memory of a system is less than a memory threshold when a first key event is detected.

In this embodiment of the present disclosure, the memory control module 1223 may detect a key event of an application program. Further, key information (for example, a process name, a user identifier (UID) and a process identifier (PID)) of the application program may be obtained using a hook function when an activity manager service (AMS) starts an activity of each application. Further, the AMS may send the obtained key information of the application program to the memory control module 1223. Therefore, the memory control module 1223 can detect the key event of the application program.

Key events of the application program may include, but is not limited to, a program start beginning event, a cleanup event, an OOM, a program start completed event, a screen-on event, a screen-off event, a screen touch event, a user interface switch interface, a task switch completed event, a broadcast event, a network connection/scanning/status change event (for example, WI-FI, second generation of wireless mobile telecommunications technology (2G), third generation of wireless mobile telecommunications technology (3G), fourth generation of wireless mobile telecommunications technology (4G), BLUETOOTH, infrared, Global Positioning System (GPS), radio broadcast, or near field communication (NFC)), a peripheral connection change event (for example, charger inserted/removed), an alert/alarm event, a phone call event (incoming call, signal change, or the like), a media event (audio/video change, or playback of recorded audio), a flash-related event, a program installation/uninstallation event, a battery level event, and the like.

In this embodiment of the present disclosure, an event that requires immediate memory reclamation may be predefined as a first key event, and the first key event may include but is not limited to the program start beginning event, the cleanup event, and the OOM event. The program start beginning event is mainly a user-triggered application program event that requires immediately start (for example, a user taps a WECHAT application). The cleanup event may include, but is not limited to, a terminal manager cleanup event, a one-touch cleanup event, an application uninstallation event, and an application cache purge event. The OOM event may include, but is not limited to, an event that memory required for starting a large-memory application exceeds a memory threshold, a system OOM event, and a forcible application stop event.

In this embodiment of the present disclosure, system memory may include occupied memory and available memory. The occupied memory is mainly memory occupied by a currently running process and service and memory occupied by kernel operation. The available memory is idle memory and cache of the system.

When the first key event is detected, the current available memory of the system may be obtained, and it is determined whether the current available memory of the system is less than the memory threshold. When the current available memory of the system is less than the memory threshold, it indicates that a memory pressure is currently present in the system and memory reclamation needs to be performed. The memory threshold is a first memory threshold corresponding to the first key event.

Optionally, the memory threshold may be statically preset. Further, there are several cases as follows.

(1) Configure the memory threshold based on a product specification.

For 2 gigabytes (GB), 3 GB, 4 GB, and 6 GB random access memory (RAM) products, the available memory of the system is different, and correspondingly, the memory threshold is also different. For example, for a 3 GB RAM product, the memory threshold may be configured to be 600 megabytes (MB), for a 4 GB RAM product, the memory threshold may be configured to be 700 MB.

(2) Configure a possibly minimum memory threshold based on an application scenario.

For different applications and different scenarios, memory consumption is different. Therefore, if the manner in (1) is used to configure a proper memory threshold, some disadvantages are present. It is possible that a third-party application intermittently stops during startup because the application is not considered. For this problem, top-ranking third-party applications in the application market may be analyzed offline in order to obtain information about maximum memory occupied by various applications in various scenarios.

Referring to Table 1, Table 1 shows information about maximum memory occupied by third-party applications in typical scenarios. It should be noted that Table 1 lists only several applications as examples.

TABLE 1

| Application | Application scenario | Occupied memory (RAM in kilobytes (KB)) | | | | Average value (KB) |
|---|---|---|---|---|---|---|
| QQ video | Viewing daily check-in | 554786 | 536644 | 502018 | | 531149 |
| Didi Chuxing | Finding | 468643 | 449101 | 390822 | | 436189 |
| TAOBAO | Quickly swiping the Tmall homepage | 468147 | 403831 | 394853 | | 422277 |
| Moji Weather | Publishing a timescape | 380951 | 428168 | 424905 | | 411341 |
| YOUKU | Tapping on the home screen to enter the YOUKU membership page | 464924 | 439859 | 255841 | | 386875 |
| Moji Weather | Checking what is new | 378418 | 348067 | 423343 | | 383276 |
| UC Browser | Quickly swiping the Sina Weibo page | 348390 | 437752 | 324717 | | 370286 |
| BAIDU Map | Tapping "Navigation" to enter the navigation page | 505256 | 368885 | 226482 | | 366874 |
| Headlines Today | My-Mall-Today's Deals | 340781 | 387801 | 360222 | | 362935 |
| Happy Elements | Check-in | 352564 | 352913 | 353630 | | 353036 |

Further, when a terminal is up and a boot completed (BOOT_COMPLETED) event is received, identifiers (for example, application names) of all applications installed on the terminal may be queried. Further, required information (for example, process names, running scenarios, maximum occupied memory information) may be obtained from Table 1 based on the application identifiers, to generate an occupied-memory list of local programs. The occupied-memory list of local programs may be stored using an Extensible Markup Language (XML) file or a TXT file. For a different application, the terminal may query maximum occupied memory information of the application from the occupied-memory list of local programs, and set the memory threshold to be the maximum occupied memory of the application.

(3) Perform configuration based on historical occupation of memory by processes running on the system.

Each user has unique characteristic. After a terminal is used for a long time, applications installed on the terminal are inconsistent with applications running on the terminal. The memory threshold may be configured based on the historical occupation of memory by processing running on the system. Further, historical status information (procstats) of memory occupation during operation of each process may be queried when the terminal is not used by a user (for example, at midnight) to obtain maximum memory occupation information (for example, the application program name and the maximum occupied memory). Further, the maximum occupied memory is compared with a current system memory threshold. If the maximum occupied memory is greater than the current system memory threshold, the maximum occupied memory is used as a new system memory threshold.

(4) Configure the memory threshold through cloud delivery.

A cloud server may collect information about memory occupied by all applications running on a terminal in various scenarios based on an identifier of the terminal, develop a sheet using information such as a name of an application that occupies memory greater than a preset value (for example, 300 MB) and a running scenario of the application then, and pushes the sheet to the terminal regularly (for example, every month). After receiving the sheet, the terminal traverses application information in the sheet and a local application list, and determines maximum memory occupation information of applications installed on the terminal. Further, the maximum occupied memory is compared with a current system memory threshold. If the maximum occupied memory is greater than the current system memory threshold, the maximum occupied memory is used as a new system memory threshold.

Optionally, the memory threshold may be dynamically configured.

Further, using a user behaviour analysis algorithm, applications most likely to be running subsequently may be predicted using a predictive algorithm based on such information as a user use habit, and a use history, a use frequency, and use duration of applications, to form an application list. Maximum memory required by the applications in the application list may be obtained, and the maximum memory is compared with the current system memory threshold. If the maximum memory is greater than the current system memory threshold, the maximum memory is used as a new system memory threshold.

Step 202: Create a background process list when the current available memory of the system is less than the memory threshold.

The background process list needs to be created immediately when a memory pressure is currently present in the system. The background process list is a dynamic bidimensional list that is sorted based on an application importance degree and a process priority, and that includes a process of one or more applications. That is, the background process list may include one or more applications, and one application may include one or more processes. The background process list is a list sorted based on the application importance degree and the process priority.

Further, a manner of creating the background process list includes the following steps.

(11) Determining a score of a key element of each application that is currently running in the background, where the key element includes one or more of a process priority, a user use habit, a process-occupied system resource, and an application relation;

(12) Performing weighted calculation on scores of all key elements of each application to obtain an importance degree of the application;

(13) Sorting all applications based on importance degrees of all the applications; and

(14) Sorting, based on process priorities, processes included in each sorted application, to generate the background process list.

In this embodiment, each application that runs in the terminal background may include one or more processes, and the key element of each application includes one or more of the process priority, the user use habit, the process-occupied system resource, and the application relation. Each key element has a corresponding score. When the background process list is created based on the key elements (the process priority, the user use habit, the process-occupied system resource, and the application relation) of the applications, a process that requires processing can be subsequently determined from the background process list based on a memory requirement. In this way, a killable process queue can be selected accurately, reducing a probability of mistaken/excessive/missed killing of processes.

The system evaluates importance of each process, and the importance of the process also represents a priority of the process. Generally, importance is represented by an OOM adjust (oom_adj) value and assigned to each process. The system determines which processes need to be terminated based on the oom_adj. Generally, an oom_adj score is provided by the system. The system assigns the oom_adj score based on a current application running status. A range of the oom_adj score is as follows: −17<oom_adj<16. A larger oom_adj score indicates a higher possibility that a process is selected to be terminated by the system, and a lower priority of the process.

The user use habit may include but is not limited to a use time record, accumulated use times, duration of each use, and accumulated use duration that are of each application. Based on the user use habit, related process information may be determined, for example, which processes are processes of an application that is frequently used by the user, which processes are processes of an application that the user has used for a relatively long time, or which processes are processes of an application that is recently used by the user. The RMS module 1221 may be used to learn an app use habit. In addition, the APP importance degree may be identified by considering three algorithms together.

Figure 2B:
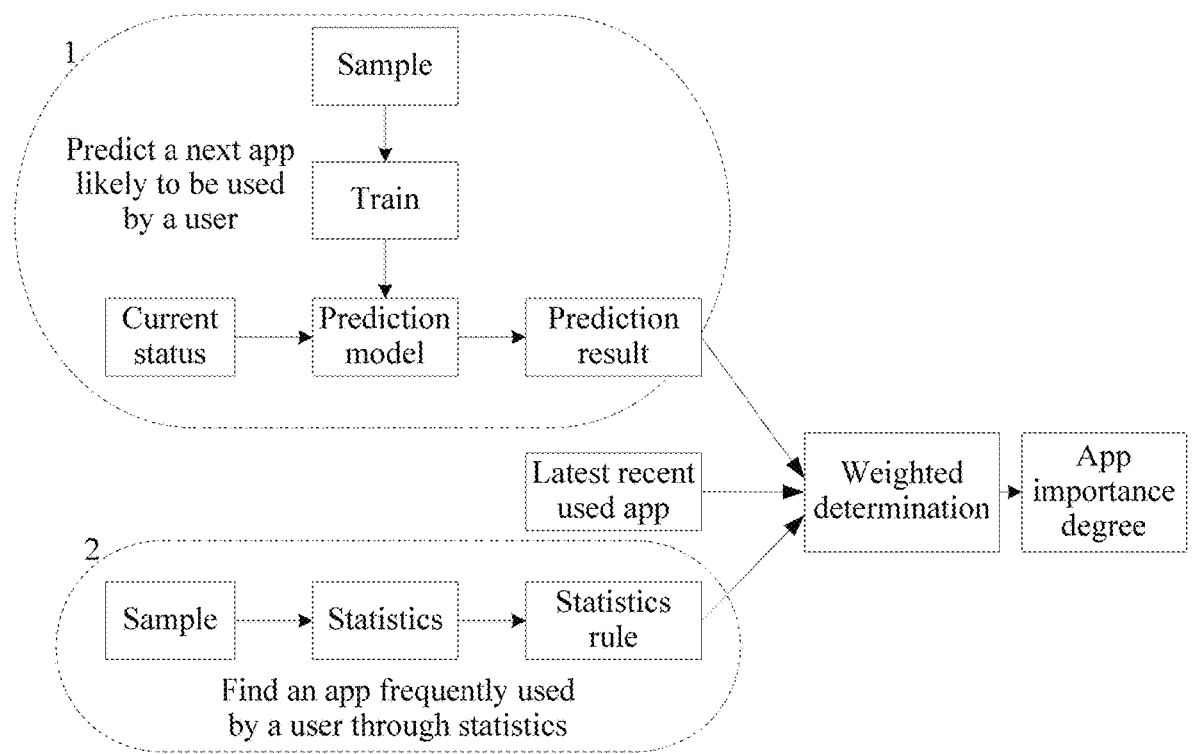
FIG. 2B is a schematic diagram of app importance degree identification disclosed in an embodiment of the present disclosure.

Referring to FIG. 2B, FIG. 2B is a schematic diagram of app importance degree identification disclosed in an embodiment of the present disclosure. As shown in FIG. 2B, a dashed box 1 represents a machine-learning-based app importance degree identification model, a dashed box 2 represents a statistics-rule-based app importance degree identification model, and a third algorithm is identification based on a latest recent used (LRU) application. For an application a, it is assumed that an importance degree identified based on machine learning is Ph(a), that an importance degree identified based on a statistics rule is Pl(a), that an importance degree identified based on an LRU application is Pu(a), and that corresponding weights are respectively Wh, Wl, and Wu. Then a formula for calculating an importance degree of the application a is:

$$P(a)=Wh*Ph(a)+Wl*Pl(a)+Wu*Pu(a)$$

The weights are obtained through continuous learning during training and are user independent. The weights are preset in an app importance degree identification plug-in and updated through version iteration.

A user use habit score may be allocated based on an application importance degree, and a range of the habit score is as follows: 0<habit<16. A lower habit score indicates more frequent use of the application by the user.

The process-occupied resource may include but is not limited to a computing resource, a storage resource, a CPU resource, and an IO resource. A process-occupied system resource score may be set based on a size of the occupied resource, and a range of the resource score is as follows: 0<resource<16. For example, when CPU occupation by a process is greater than 3%, the resource score is 16. Generally, more system resources occupied by a process indicate that the process is more likely to be selected for which memory corresponding to the process is to be reclaimed.

The application relation refers to a relation that exists between applications. Further, two applications may be related using a process. In this embodiment of the present disclosure, the application relation may be a relation between a background application and a foreground application. This relation is transient and may be updated in real time based on a current process status. The relation includes but is not limited to getContentProvider, startActivity, bindService, unbindService, startService, stopService, and widget.

Figure 2C:
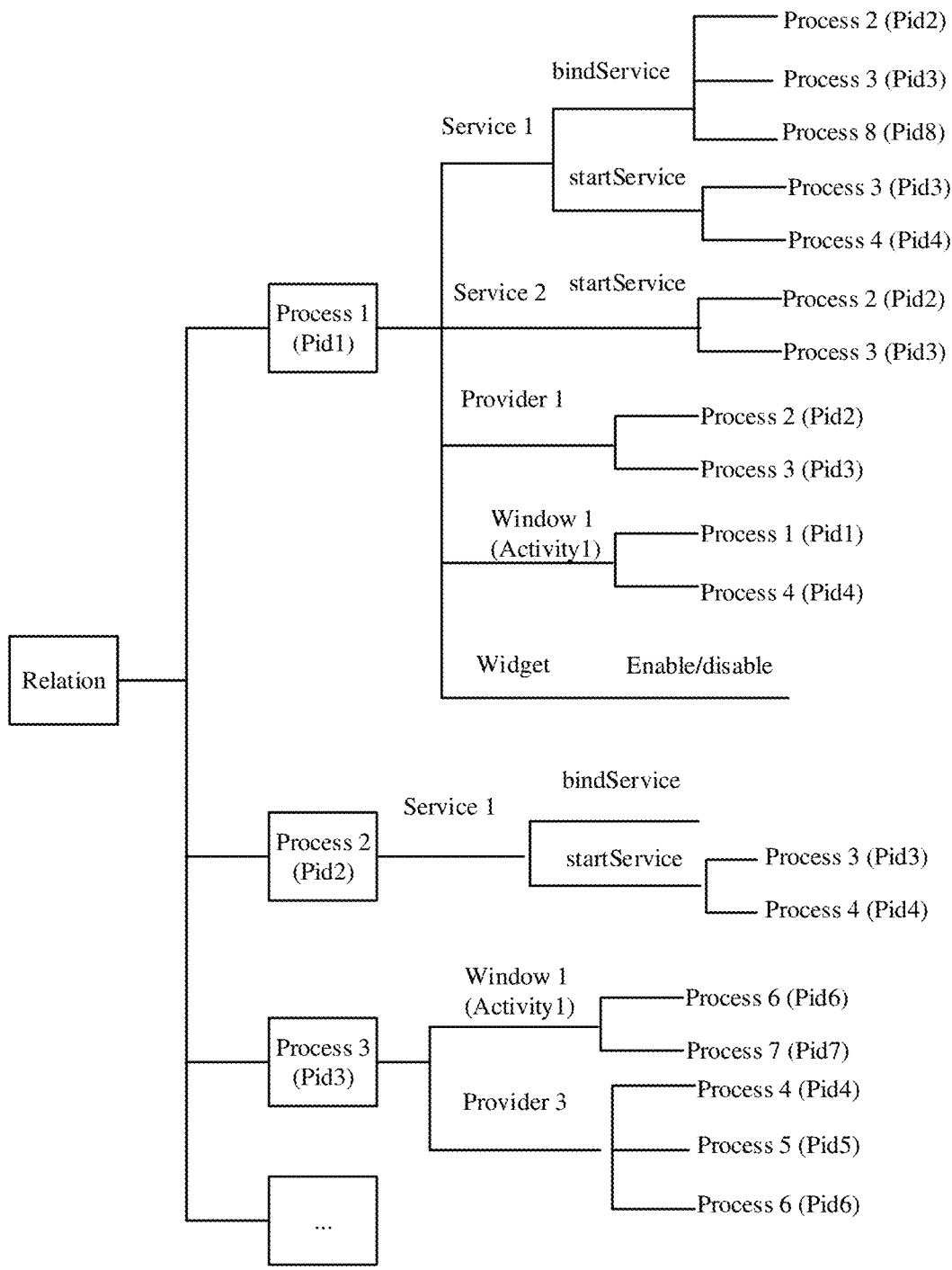
FIG. 2C is a schematic diagram of an application relation disclosed in an embodiment of the present disclosure.

Referring to FIG. 2C, FIG. 2C is a schematic diagram of an application relation disclosed in an embodiment of the present disclosure, where Pid1, Pid2, Pid3, Pid4 . . . represent process identifiers. A leftmost process in FIG. 2C is relied on by a rightmost process and a relation exists between the two processes. For example, Service1 of a process Pid1 is related to a process Pid2 using bindService, and Service1 of a process Pid2 is related to a process Pid3 using startService.

Generally, during background process cleanup, a cleared process may possibly be pulled up by a process related to the cleaned process, or functional anomaly may result because a process is cleared. For example, a foreground input method needs to use an independent background provider process, and if the independent background provider process is frozen or cleaned, the foreground input method becomes abnormal. When a background application is playing music while music relies on an independent background service process, if the independent service process is frozen or cleared, the music playing application becomes abnormal. A user may set an application relation (application-relation) score for a subsequent weighted operation. A range of the application-relation score is as follows: 0<application-relation<16. If applications are directly related, the application-relation score may be 0, if applications are indirectly associated, the application-relation score may be 16. A higher application-relation score indicates a weaker relation between an application and another application.

Further, for each application, weighted calculation may be performed on scores of all key elements to obtain an importance degree of the application. Further, the algorithm is as follows:

$$\text{Score}=\text{oom\_adj}*P_{oom\_adj}+\text{habit}*P_{habit}+\text{resource}*P_{resource}+\text{application-relation}*P_{application\text{-}relation},$$

where $P_{oom\_adj}+P_{habit}+P_{resource}+P_{application\text{-}relation}=1$.

The score may be used to measure an importance degree of an application, and a smaller score indicates a higher importance degree of the application. For example, if a score of an application 1 is higher than a score of an application 2, it may be determined that an importance degree of the application 2 is higher than that of the application 1.

Still further, applications may be sorted based on the score. For each application, when the application includes at least two processes, the processes included in the application may be sorted based on process priorities to generate a background process list. The background process list is actually a bidimensional list that includes applications and processes of the applications. In this bidimensional list, applications are sorted based on importance degrees in descending or ascending order, and the processes of the applications are sorted based on process priorities in descending or ascending order.

Referring to Table 2, Table 2 is an application-process list disclosed in an embodiment of the present disclosure.

TABLE 2

| Application 1 | Process 1 |
|---|---|
|  | Process 2 |
| Application 2 | Process 3 |
|  | Process 4 |
|  | Process 5 |
| Application 3 | Process 6 |
|  | Process 7 |
|  | Process 8 |
| . . . | . . . |
| Application n | . . . |

Applications running on a system may be classified into 18 categories, mainly including key system services, key resident applications, foreground applications, system servers, background applications relied on by a foreground application, common system services, common resident applications, applications homed in the background, user-perceivable background applications, visible applications, phone-manager-protected background applications, applications last running in the foreground, background applications in weak relation with the foreground, applications habitually used by a user, applications with a preconfigured importance degree, applications whose oom_adj is greater than 2, applications identified by the system as harmful, and applications manually identified as harmful (blacklisted).

In an optional implementation, the background process list may be one list (such as the foregoing Table 2), or the background process list may include three lists (for example, the foregoing Table 2 may be divided into three parts to form three sub-lists) that are an irreclaimable list, an important process list, and a killable list, respectively. The irreclaimable list mainly includes system processes and services. Lacking of these processes will affect running of all applications. Examples are the key system services, the key resident applications, the foreground applications, the system servers, and the background applications relied on by a foreground application. The important process list mainly includes device threshold applications, user-perceivable applications, and important applications frequently used by the user, for example, the common system services, the common resident applications, the applications homed in the background, the user-perceivable background applications, the visible applications, the phone-manager-protected background applications, the applications last running in the foreground, and the background applications in weak relation with the foreground. The killable list mainly includes related categories of applications such as the applications habitually used by the user, the applications with a preconfigured importance degree, the applications whose oom_adj is greater than 2, the applications identified by the system as harmful, and the applications manually identified as harmful.

Step 203: Determine a process for which memory is to be reclaimed from the background process list.

When the background process list includes three sub-lists, the memory reclamation list is handled in the order of during memory reclamation, processes in the killable list are reclaimed and the reclamation is performed from the end of the killable list bottom up, when the killable list is empty and a system memory pressure is still present, processes in the important process list are reclaimed and the reclamation is still performed from the end of the important process list bottom up. Based on this principle, a process for which memory is to be reclaimed may be determined from the killable list first, and then a process for which memory is to be reclaimed may be determined from the important process list.

Optionally, the foregoing classification of lists may be changed. For example, a process that is in the important process list and whose importance is not high enough may be degraded and included in the killable list.

The background process list includes processes of a plurality of applications. The process for which memory is to be reclaimed is a process among the processes of the plurality of applications that meets a condition that an absolute value of a difference between memory occupied by the process and a memory pressure value is less than a preset threshold, and the memory pressure value is a difference between the memory threshold and the current available memory of the system. That is, the memory occupied by the process for which memory is to be reclaimed may be greater than the memory pressure value, or may be less than the memory pressure value. The absolute value of the difference between the memory occupied by the process for which memory is to be reclaimed and the memory pressure value is in a given range. That is, the absolute value is less than the preset threshold. The preset threshold may be user-defined, or may be system default. This is not limited in this embodiment of the present disclosure.

Memory pressure levels are preset as a high level, a medium level, and a low level. The high level indicates that the memory pressure is relatively large, the medium level indicates that the memory pressure is moderate, and the low level indicates that the memory pressure is relatively small. In addition, a memory pressure value range is preset as a first range, a second range, and a third range, where the first range is less than the second range, and the second range is less than the third range. A current memory pressure level of the system may be determined based on the memory pressure value range. For example, when the memory pressure value is in the first range, the current memory pressure level of the system may be determined to be the low level, when the memory pressure value is in the second range, the current memory pressure level of the system may be determined to be the medium level, and when the memory pressure value is in the third range, the current memory pressure level of the system may be determined to be the high level.

When the current memory pressure level of the system is determined to be the high level, a policy of clearing the process for which memory is to be reclaimed needs to be used. According to this policy, a resource occupied by an existing process in the terminal needs to be destroyed and reclaimed in order to increase the available memory of the system.

When the current memory pressure level of the system is determined to be the medium level, a policy of clearing the process for which memory is to be reclaimed on a system level or an application level needs to be used. According to the system-level memory reclamation policy, system cache may be reclaimed based on an importance degree in order to achieve a purpose of increasing idle memory. One application may have one or more processes. Therefore, the application-level memory reclamation policy, for example, kill, compress, or drop cache, may be used.

When the current memory pressure level of the system is determined to be the low level, a policy of performing process-level compressing or process-level cache reclamation needs to be used for the process for which memory is to be reclaimed based on an application importance degree. If the application importance degree is relatively high, process-level compressing may be performed for the process for which memory is to be reclaimed, and if the application importance degree is relatively low, process-level cache reclamation may be performed for the process for which memory is to be reclaimed. The process-level compressing on the process for which memory is to be reclaimed is to perform compression processing on a memory resource occupied by the process running on the terminal using a swap partition in order to achieve a purpose of reducing occupation of physical memory of the system. The process-level cache reclamation on the process for which memory is to be reclaimed is to release memory space occupied by a cache in the terminal in advance in order to reduce cache-occupied memory, increase idle memory, and thereby increase memory allocation efficiency.

In this embodiment of the present disclosure, the process for which memory is to be reclaimed may be determined from the background process list based on the current memory pressure of the system. In this way, an important process is not killed by mistake, and excessive or missed killing of processes is avoided.

Step 204: Send a processing instruction to a system kernel to trigger the system kernel to perform processing on the process for which memory is to be reclaimed in order to reclaim memory occupied by the process for which memory is to be reclaimed.

In this embodiment of the present disclosure, different memory reclamation policies may be used for different memory pressure levels, and each memory reclamation policy corresponds to one interface. The processing instruction may be sent to the system kernel using an interface corresponding to a memory reclamation policy. After receiving the processing instruction, the system kernel uses the corresponding memory reclamation policy to perform processing on the process for which memory is to be reclaimed in order to reclaim the memory corresponding to the process for which memory is to be reclaimed.

The processing instruction may be sent to the system kernel using a KILL_SIG signal. Usually, one processing instruction may carry an identifier of one process for which memory is to be reclaimed.

There may be one or more processes determined for which memory is to be claimed. When one process requires sending a plurality of processing instructions, the processing instructions may be sent successively one by one for the process, without a need to check, after sending one processing instruction, a state of memory corresponding to the process for which memory is reclaimed by the system kernel before sending another processing instruction.

In an optional implementation, when a plurality of processes for which memory is to be reclaimed are determined, sending a processing instruction to a system kernel includes calling a plurality of threads to send a plurality of processing instructions to the system kernel, where each thread is used to send one or more processing instructions.

In this optional implementation, when a plurality of processes for which memory is to be reclaimed is determined, a plurality of threads may be called to send a plurality of processing instructions to the system kernel. Further, implementation of sending a plurality of processing instructions by one thread is that the thread sends the processing instructions successively one by one, without a need to check, after sending one processing instruction, the state of the memory corresponding to the process for which memory is reclaimed by the system kernel before sending another processing instruction. After the system reclaims the memory occupied by the process for which memory is to be reclaimed, a current memory pressure of the system may be relieved.

It can be learned that in this implementation, it is not necessary to wait for the system kernel to truly complete a reclamation operation on memory corresponding to a process, and a mechanism of asynchronous reclamation of memory corresponding to processes for which memory is to be reclaimed may be used directly, to improve background process reclamation performance and improve memory reclamation efficiency.

Figure 2D:
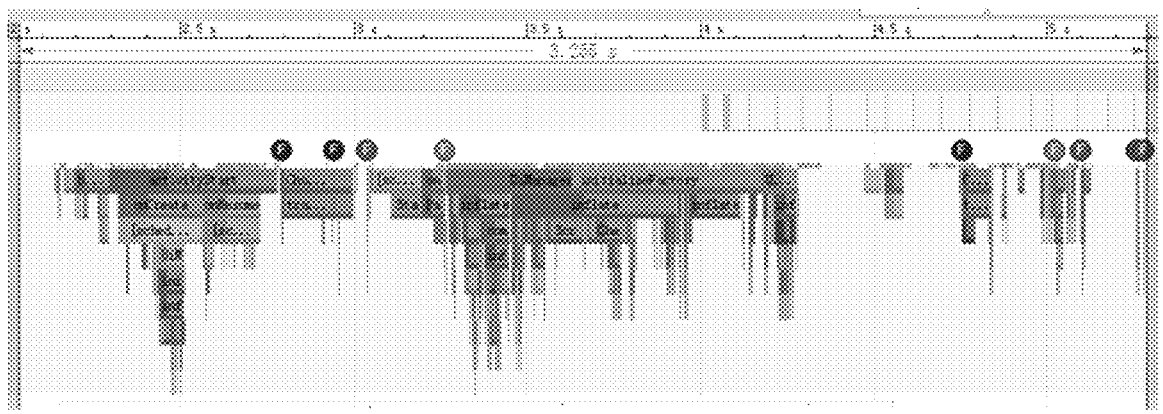
FIG. 2D is a diagram of a camera start sequence disclosed in an embodiment of the present disclosure.
Figure 2E:
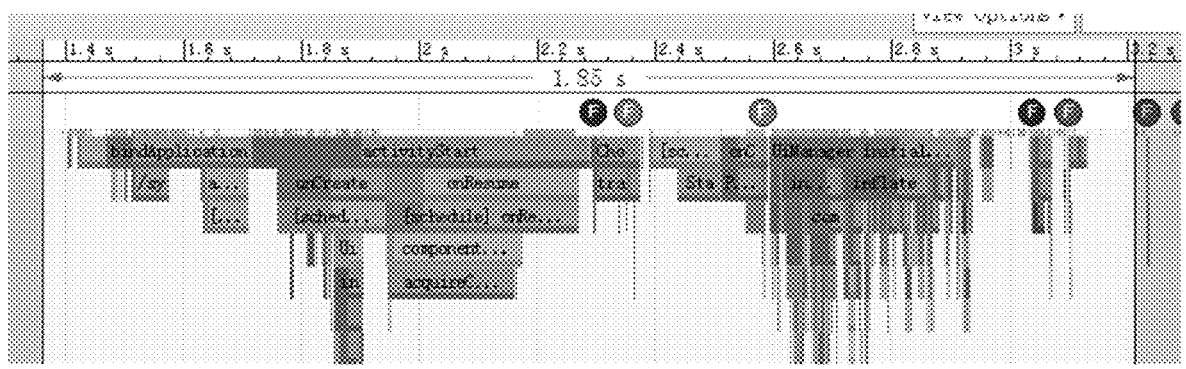
FIG. 2E is a diagram of another camera start sequence disclosed in an embodiment of the present disclosure.

Referring to FIG. 2D and FIG. 2E, FIG. 2D is a diagram of a camera start sequence disclosed in an embodiment of the present disclosure, and FIG. 2E is a diagram of another camera start sequence disclosed in an embodiment of the present disclosure. In FIG. 2D, when the available memory of the system is only 619 MB, memory reclamation is not performed when a camera application program begins to start. When the memory of the system is below a system waterline, a low memory killer (LMK) mechanism is used for memory reclamation. It can be learned from FIG. 2D that it takes 3.255 seconds (s) in total from the start of the entire camera at only 619 MB memory to appearance of a shoot button of the camera. In FIG. 2E, when the available memory of the system is only 604 MB, the solution in the embodiments of the present disclosure is used so that memory reclamation is performed using a corresponding policy when a camera application program begins to start. It can be learned from FIG. 2E that it takes 1.85 s in total from the start of the entire camera at only 604 MB memory to appearance of a shoot button of the camera. From comparison between FIG. 2D and FIG. 2E, it can be learned that in a same test environment, when available memory does not differ much, camera start performance is significantly improved in the solution of the present disclosure in comparison with the conventional LMK solution.

It can be learned that in the method process described in FIG. 2A, when the first key event is detected and it is determined that the current available memory of the system is less than the memory threshold, proactive memory reclamation may be performed. When an application program truly requires a large amount of memory, the system kernel has already reclaimed a large amount of available memory. Therefore, a probability of intermittent stops of the terminal can be reduced.

Figure 3:
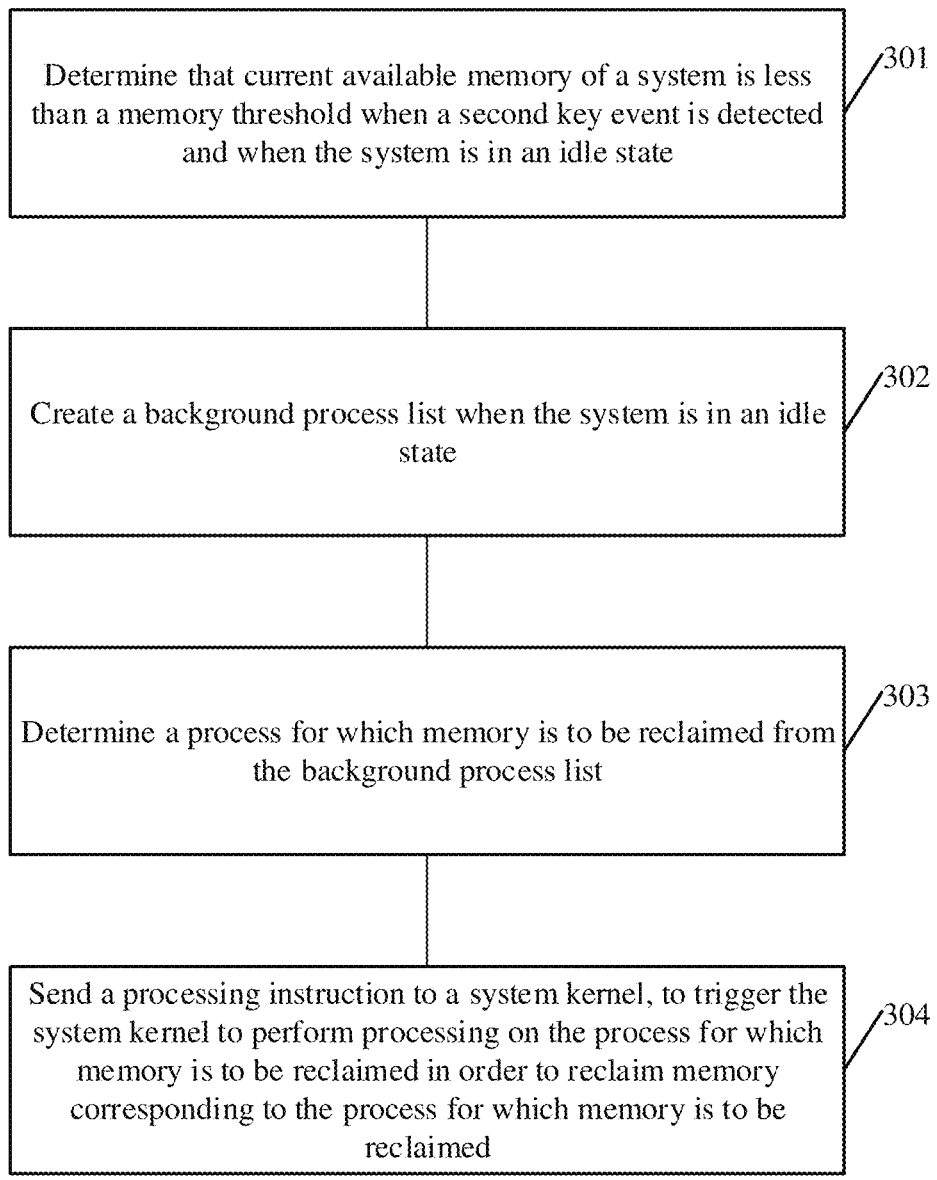
FIG. 3 is a schematic flowchart of another memory reclamation method disclosed in an embodiment of the present disclosure.

Referring to FIG. 3, FIG. 3 is a schematic flowchart of another memory reclamation method disclosed in an embodiment of the present disclosure. The method may be applied to the memory control module 1223 shown in FIG. 1. Further, the memory control module 1223 may be one or more threads, or the memory control module 1223 may be one or more processes. As shown in FIG. 3, the method may include the following steps.

Step 301: Determine that current available memory of a system is less than a memory threshold when a second key event is detected and when the system is in an idle state.

In this embodiment of the present disclosure, the memory control module 1223 may detect a key event of an application program. Further, key information (for example, a process name, a UID and a PID) of the application program may be obtained using a hook function when an AMS starts an activity of each application. Further, the AMS may send the obtained key information of the application program to the memory control module 1223. Therefore, the memory control module 1223 can detect the key event of the application program.

Key events of the application program may include, but is not limited to, a program start beginning event, a cleanup event, an OOM, a program start completed event, a screen-on event, a screen-off event, a screen touch event, a user interface switch interface, a task switch completed event, a broadcast event, a network connection/scanning/status change event (for example, WI-FI, 2/3/4G, BLUETOOTH, infrared, GPS, radio broadcast, or NFC), a peripheral connection change event (for example, charger inserted/removed), an alert/alarm event, a phone call event (incoming call, signal change, or the like), a media event (audio/video change or playback of recorded audio), a flash-related event, a program installation/uninstallation event, a battery level event, and the like.

In this embodiment of the present disclosure, if a man-machine interaction operation is currently present in the system and the system directly performs memory reclamation, user experience is possibly affected because a prompt response to a user operation cannot be obtained from a CPU. In this case, immediate memory reclamation cannot be performed.

An event that does not require immediate memory reclamation may be predefined as a second key event. The second key event may include but is not limited to a program start completed event, a screen-on event, a screen-off event, a screen touch event, a user interface switch event, a task switch completed event, and a broadcast event.

When the second key event is detected, it is first determined whether the system is in an idle state. Then, when the system is in an idle state, the current available memory of the system is read and it is determined whether the current available memory of the system is less than the memory threshold. When the current available memory of the system is less than the memory threshold, it indicates that a memory pressure is currently present in the system and memory reclamation needs to be performed. The memory threshold is a first memory threshold corresponding to the second key event. The idle state of the system may include a terminal idle state of a terminal and an application idle state.

Optionally, the memory threshold may be statically preset, or the memory threshold may be dynamically configured. For specific information, refer to the descriptions in FIG. 2A, and details are not described herein again.

Optionally, whether the system is in an idle state may be determined by reading a running status of the terminal, or whether the system is in an idle state may be determined by determining a current load status of the system.

There are two scenarios in which the system is in an idle state. A first scenario is that the terminal is not being used by a user. For example, the terminal may be considered to be in an idle state when the terminal is in a standby state. For another example, when start of an application is completed and a display screen appears, but there is no interaction with the terminal afterwards, in this case, the system does not have a large quantity of IO operations and may be considered to be in an idle state. A second scenario is that the system may be considered to be in an idle state when the terminal is being used by a user but current system load does not affect user experience, for example, when the system load is less than a load threshold.

Further, determining that the system is in an idle state may include the following steps.

(11) Determine whether current load of the system is less than a load threshold.

(12) When the current load of the system is less than the load threshold, determine that the system is in an idle state.

In this embodiment, a load threshold may be preset. The load threshold may be a critical value of system load that affects user experience. If the current system load is less than the load threshold, it indicates that the current system load does not affect user experience, and it may be determined that the system is in an idle state.

Step 302: Create a background process list when the system is in an idle state.

In this embodiment of the present disclosure, memory reclamation needs to be performed when the system is in an idle state. However, the background process list is a dynamic list. Therefore, the background process list also needs to be created when the system is in an idle state. This can ensure validity of the background process list.

Step 303: Determine a process for which memory is to be reclaimed from the background process list.

Step 304: Send a processing instruction to a system kernel, to trigger the system kernel to perform processing on the process for which memory is to be reclaimed in order to reclaim the memory corresponding to the process for which memory is to be reclaimed.

It can be learned that in the method process described in FIG. 3, it is determined that the current available memory of the system is less than the memory threshold when the second key event is detected and when the system is in an idle state, and active memory reclamation may be performed. When an application program truly requires a large amount of memory, the system kernel has already reclaimed a large amount of available memory. Therefore, a probability of intermittent stops of the terminal can be reduced.

Figure 4:
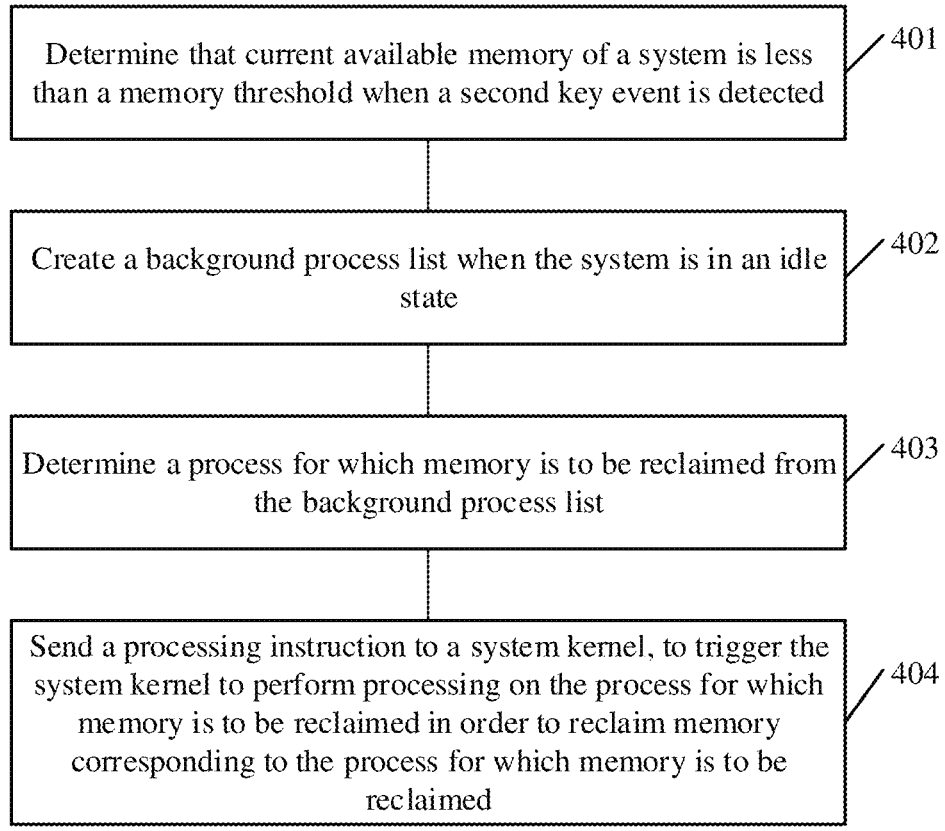
FIG. 4 is a schematic flowchart of another memory reclamation method disclosed in an embodiment of the present disclosure.

Referring to FIG. 4, FIG. 4 is a schematic flowchart of another memory reclamation method disclosed in an embodiment of the present disclosure. The method may be applied to the memory control module 1223 shown in FIG. 1. Further, the memory control module 1223 may be one or more threads, or the memory control module 1223 may be one or more processes. As shown in FIG. 4, the method may include the following steps.

Step 401: Determine that current available memory of a system is less than a memory threshold when a second key event is detected.

For specific information about the second key event, refer to the descriptions in FIG. 3, and details are not described herein again. For specific information about the memory threshold, refer to the descriptions in FIG. 2A, and details are not described herein again.

In this embodiment of the present disclosure, in the embodiment shown in FIG. 3, when the second key event is detected, it is first determined whether the system is in an idle state, and then when the system is in an idle state, the current available memory of the system is read. In the embodiment shown in FIG. 4, however, when the second key event is detected, the current available memory of the system is read first, and then when the current available memory of the system is less than the memory threshold, it is determined whether the system is in an idle state. When the system is in an idle state, step 402 is performed.

Step 402: Create a background process list when the system is in an idle state.

Step 403: Determine a process for which memory is to be reclaimed from the background process list.

Step 404: Send a processing instruction to a system kernel, to trigger the system kernel to perform processing on the process for which memory is to be reclaimed in order to reclaim the memory corresponding to the process for which memory is to be reclaimed.

It can be learned that in the method process described in FIG. 4, when the second key event is detected and it is determined that the current available memory of the system is less than the memory threshold, proactive memory reclamation may be performed when the system is in an idle state. When an application program truly requires a large amount of memory, the system kernel has already reclaimed a large amount of available memory. Therefore, a probability of intermittent stops of the terminal can be reduced.

Figure 5:
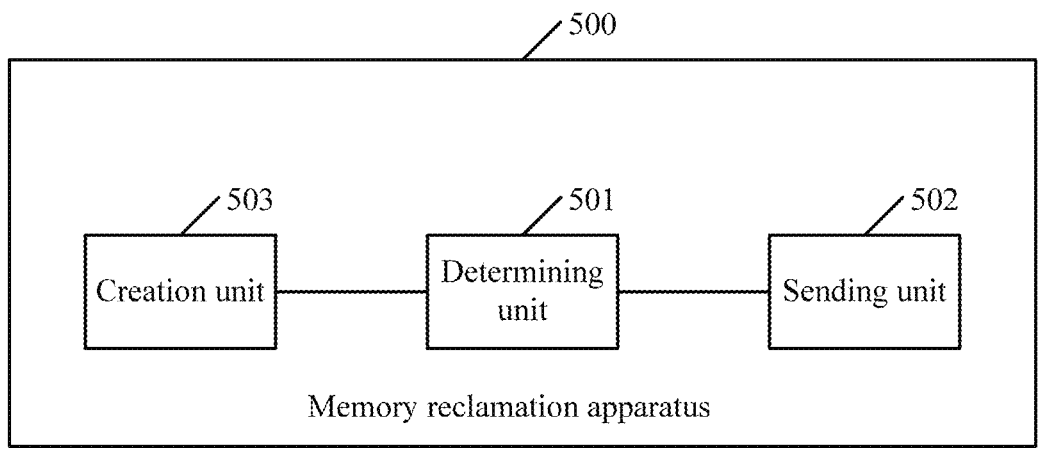
FIG. 5 is a schematic structural diagram of a memory reclamation apparatus disclosed in an embodiment of the present disclosure.

Referring to FIG. 5, FIG. 5 is a schematic structural diagram of a memory reclamation apparatus disclosed in an embodiment of the present disclosure. The memory reclamation apparatus may be configured to perform some or all steps of the memory reclamation method described in FIG. 2A to FIG. 4. For specific information thereof, refer to related descriptions of FIG. 2A to FIG. 4. Details are not described herein again. As shown in FIG. 5, the memory reclamation apparatus 500 may include a determining unit 501 configured to, when current available memory of a system is less than a memory threshold, determine a process for which memory is to be reclaimed from a background process list, where the background process list includes a process of one or more applications, the process for which memory is to be reclaimed is a process that is among the process of the one or more applications and that meets a condition that an absolute value of a difference between memory occupied by the process and a memory pressure value is less than a preset threshold, and the memory pressure value is a difference between the memory threshold and the current available memory of the system, and a sending unit 502 configured to send a processing instruction to a system kernel to trigger the system kernel to perform processing on the process for which memory is to be reclaimed in order to reclaim the memory occupied by the process for which memory is to be reclaimed.

Optionally, the operation of determining that current available memory of a system is less than a memory threshold is triggered when a first key event is detected, and the memory threshold is a first memory threshold corresponding to the first key event. The first key event includes any one of the following events a program start beginning event, a cleanup event, and an OOM event.

Optionally, the operation of determining that current available memory of a system is less than a memory threshold is triggered when a second key event is detected and when the system is in an idle state, and the memory threshold is a second memory threshold corresponding to the second key event.

Optionally, the operation of determining that current available memory of a system is less than a memory threshold is triggered when a second key event is detected, the operation of determining a process for which memory is to be reclaimed from a background process list is triggered when the system is in an idle state, and the memory threshold is a second memory threshold corresponding to the second key event. The second key event includes any one of the following events a program start completed event, a screen-on event, a screen-off event, a screen touch event, a user interface switch event, a task switch completed event, and a broadcast event.

Optionally, the determining unit 501 is further configured to determine whether current load of the system is less than a load threshold, and when the current load of the system is less than the load threshold, determine that the system is in an idle state.

Optionally, when a plurality of processes for which memory is to be reclaimed are determined, the sending unit 502 is further configured to call a plurality of threads to send a plurality of processing instructions to the system kernel, where each thread is used to send one or more processing instructions.

Optionally, the determining unit 501 is further configured to determine, based on ascending order of application importance degrees, at least one application from a plurality of applications included in the background process list, and determine, based on ascending order of process priorities, the process for which memory is to be reclaimed from processes included in the at least one application.

Optionally, the memory reclamation apparatus 500 further includes a creation unit 503 configured to create the background process list when the determining unit 501 determines that the current available memory of the system is less than the memory threshold, or configured to create the background process list when the determining unit 501 determines that the current available memory of the system is less than the memory threshold and that the system is in an idle state.

Optionally, the creation unit 503 is further configured to determine a score of a key element of each application that is currently running in the background, where the key element includes one or more of the following a process priority, a user use habit, a process-occupied system resource, and an application relation, perform weighted calculation on scores of all key elements of each application to obtain an importance degree of the application, sort all applications based on importance degrees of all the applications, and sort, based on process priorities, processes included in each sorted application to generate the background process list.

In the memory reclamation apparatus described in FIG. 5, when the current available memory of the system is less than the memory threshold, proactive memory reclamation may be performed. When an application program truly requires a large amount of memory, the system kernel has already reclaimed a large amount of available memory. Therefore, a probability of intermittent stops of the terminal can be reduced.

Figure 6:
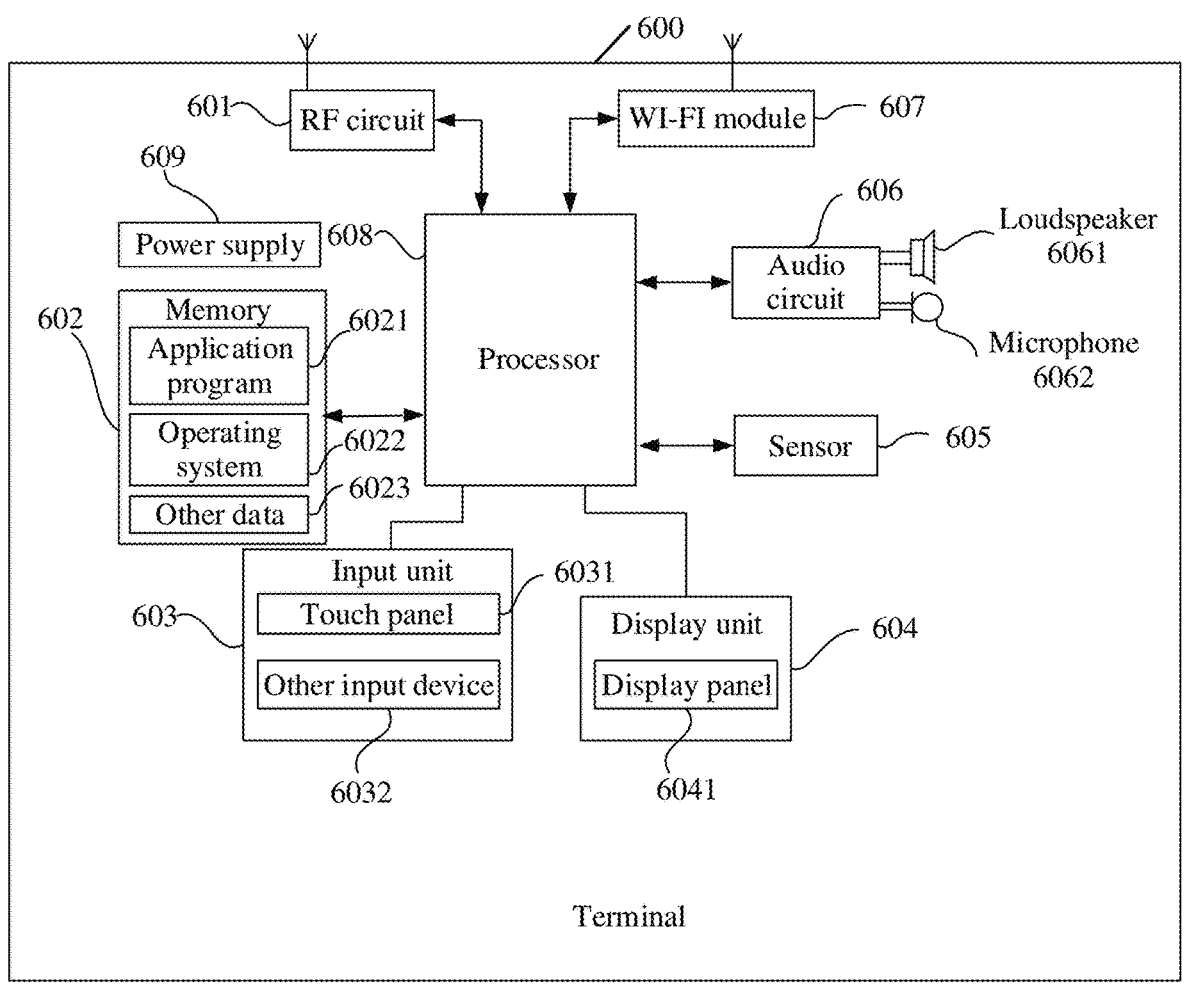
FIG. 6 is a schematic structural diagram of a terminal disclosed in an embodiment of the present disclosure.

Referring to FIG. 6, FIG. 6 is a schematic structural diagram of a terminal 600 disclosed in an embodiment of the present disclosure. The terminal 600 may be configured to perform some or all steps of the memory reclamation method described in FIG. 2A to FIG. 4. For specific information thereof, refer to related descriptions of FIG. 2A to FIG. 4. Details are not described herein again. As shown in FIG. 6, the terminal 600 includes such components as a radio frequency (RF) circuit 601, a memory 602, an input unit 603, a display unit 604, a sensor 605, an audio circuit 606, a WI-FI module 607, a processor 608, and a power supply 609. A person skilled in the art may understand that, the terminal structure shown in FIG. 6 does not constitute a limitation on a mobile phone, and the terminal may include more or fewer components than those shown in the diagram, or some components may be combined, or the components may be arranged in a different manner.

The RF circuit 601 may be configured to receive and send information, or receive and send a signal during a call. In particular, the RF circuit 601 may receive downlink information of a base station, and send the downlink information to the processor 608 for processing. In addition, the RF circuit 601 sends related uplink data to the base station. Generally, the RF circuit 601 includes but is not limited to an antenna, at least one amplifier, a transceiver, a coupler, a low noise amplifier (LNA), a duplexer, and the like. In addition, the RF circuit 601 may also communicate with a network and other devices via radio communication. Any communications standard or protocol may be used for the radio communication, including but not limited to Global System of Mobile Communications (GSM), General Packet Radio Service (GPRS), Code Division Multiple Access (CDMA), Wideband CDMA (WCDMA), Long Term Evolution (LTE), email, and short message service (SMS).

The memory 602 stores a computer program and the computer program includes an application program 6021 and an operating system 6022. The processor 608 is configured to read the computer program in the memory 602, and then execute a method defined in the computer program. For example, the processor 608 reads the operating system 6022 in order to run an operating system on the terminal 600 and implement various functions of the operating system. Alternatively, the processor 608 reads one or more application programs 6021 in order to run an application on the terminal 600. The operating system 6022 includes a computer program that can implement the memory reclamation method provided in this embodiment of the present disclosure such that after the processor 608 reads the operating system 6022 and runs the operating system, the operating system may possess a memory reclamation function provided in the embodiments of the present disclosure. In addition, the memory 602 further stores other data 6023 different from the computer program, where the other data 6023 may include data generated after the operating system 6022 or the application program 6021 is run, and the data includes system data (for example, configuration parameters of the operating system) and user data. In addition, the memory 602 usually includes an internal memory and an external memory. The internal memory may be a RAM, a read only memory (ROM), a high-speed cache, or the like. The external memory may be a hard disk, an optical disc, a universal serial bus (USB) disk, a floppy disk, a tape drive, or the like. The computer program is generally stored in the external memory, and before performing processing, the processor loads the computer program to the internal memory from the external memory.

The input unit 603 may be configured to receive input digit or character information and generate key signal input related to user setting and function control of the terminal 600. Further, the input unit 603 may include a touch panel 6031 and other input devices 6032. The touch panel 6031, also referred to as a touchscreen, may collect a touch operation performed by a user on or in the vicinity of the touch panel 6031 (for example, an operation performed on the touch panel 6031 or in the vicinity of the touch panel 6031 by the user using a finger, a stylus, or any other appropriate object or accessory), and drive a corresponding connection apparatus according to a preset program. Optionally, the touch panel 6031 may include two parts, a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 608, and can receive a command sent by the processor 608 and execute the command. In addition, the touch panel 6031 may be implemented in a plurality of types, for example, a resistive type, a capacitive type, an infrared type, and a surface acoustic wave type. In addition to the touch panel 6031, the input unit 603 may further include the other input devices 6032. Further, the other input devices 6032 may include but are not limited to one or more of a physical keyboard, a function key (such as a volume control key or a switch key), a trackball, a mouse, and a joystick.

A display unit 604 may be configured to display information entered by a user, information provided to the user, and various menus of the mobile phone. The display unit 604 may include a display panel 6041. Optionally, the display panel 6041 may be configured in a form of a liquid crystal display (LCD), an organic light-emitting diode (OLED), or the like. Further, the touch panel 6031 may cover the display panel 6041. After detecting a touch operation on or near the touch panel 6031, the touch panel 6031 sends the touch operation to the processor 608 to determine a type of a touch event. Then the processor 608 provides corresponding visual output on the display panel 6041 based on the type of the touch event. Although in FIG. 6, the touch panel 6031 and the display panel 6041 are used as two separate components to implement input and input functions of the mobile phone, in some embodiments, the touch panel 6031 may be integrated with the display panel 6041 to implement input and output functions of the mobile phone.

The sensor 605 may be a light sensor, a motion sensor, or another sensor. Further, the light sensor may include an ambient light sensor and a proximity sensor. The ambient light sensor may adjust luminance of the display panel 6041 based on brightness of ambient light. The proximity sensor may turn off the display panel 6041 and/or backlighting when the mobile phone moves to an ear. As a type of motion sensor, an accelerometer sensor can detect a value of an acceleration in each direction (usually, there are three axes), can detect a value and a direction of gravity when the mobile phone is static, and can be applied to an application that recognizes mobile phone postures (for example, switch between landscape and portrait screens, a related game, and magnetometer posture calibration), a vibration-recognition related function (such as a pedometer and a tap), and the like. The mobile phone may be further provided with a gyroscope, a barometer, a hygrometer, a thermometer, an infrared sensor, and other sensors, and details are not described herein.

The audio circuit 606, a loudspeaker 6061, and a microphone 6062 can provide an audio interface between the user and the mobile phone. The audio circuit 606 may transmit, to the loudspeaker 6061, an electrical signal that is obtained after conversion of received audio data, and the loudspeaker 6061 converts the electrical signal into an acoustic signal and outputs the acoustic signal. In another aspect, the microphone 6062 converts a collected acoustic signal into an electrical signal, the audio circuit 606 receives the electrical signal and converts the electrical signal into audio data, and outputs the audio data to the processor 608 for processing, and processed audio data is sent to, for example, another mobile phone via the RF circuit 601, or the audio data is output to the memory 602 for further processing.

WI-FI is a short-range wireless transmission technology, and the terminal may help, using the WI-FI module 607, the user to, for example, send and receive an e-mail, browse a web page, or access streaming media. The WI-FI module 607 provides wireless broadband Internet access for the user. Although FIG. 6 shows the WI-FI module 607, it can be understood that the WI-FI module 607 is not a necessary constituent of the terminal and may be omitted well as required provided that the essence of the present disclosure is not changed.

The processor 608 is a control center of the terminal, and is configured to connect various parts of the entire terminal using various interfaces or lines, and perform various functions of the terminal and process data by running or executing software programs and/or modules stored in the memory 602 and calling data stored in the memory 602 in order to perform overall monitoring on the terminal. Optionally, the processor 608 may include one or more processors. For example, the processor 608 may include one or more central processing units, or include one central processing unit and one graphics processing unit. When the processor 608 includes a plurality of processors, the plurality of processors may be integrated in a same chip, or may be chips separate from each other. One processor may include one or more processor cores.

The terminal 600 further includes the power supply 609 (for example, a battery) that supplies power to the components. The power supply may be logically connected to the processor 608 using a power supply management system. In this way, functions such as management of charging, discharging, and power consumption are implemented using the power supply management system.

Although not shown, the terminal may further include a camera, a BLUETOOTH module, and the like, and details are not described herein.

In the foregoing embodiment, various method steps may be implemented based on the terminal structure, and the application layer and the operating system kernel can both be considered as components of an abstract structure of the processor 608.

In this embodiment of the present disclosure, the processor 608 is configured to perform the following operations by calling program code stored in the memory 602 when current available memory of a system is less than a memory threshold, determining a process for which memory is to be reclaimed from a background process list, where the background process list includes a process of one or more applications, the process for which memory is to be reclaimed is a process that is among the process of the one or more applications and that meets a condition that an absolute value of a difference between memory occupied by the process and a memory pressure value is less than a preset threshold, and the memory pressure value is a difference between the memory threshold and the current available memory of the system, and sending a processing instruction to a system kernel, to trigger the system kernel to perform processing on the process for which memory is to be reclaimed in order to reclaim the memory occupied by the process for which memory is to be reclaimed.

The operation of determining that current available memory of a system is less than a memory threshold is triggered when a first key event is detected, and the memory threshold is a first memory threshold corresponding to the first key event.

The first key event includes any one of a program start beginning event, a cleanup event, and an OOM event.

The operation of determining that current available memory of a system is less than a memory threshold is triggered when a second key event is detected and when the system is in an idle state, and the memory threshold is a second memory threshold corresponding to the second key event.

The operation of determining that current available memory of a system is less than a memory threshold is triggered when a second key event is detected, the operation of determining a process for which memory is to be reclaimed from a background process list is triggered when the system is in an idle state, and the memory threshold is a second memory threshold corresponding to the second key event.

The second key event includes any one of the following events a program start completed event, a screen-on event, a screen-off event, a screen touch event, a user interface switch event, a task switch completed event, and a broadcast event.

In another optional implementation, determining, by the processor 608, that the system is in an idle state includes determining whether current load of the system is less than a load threshold, and when the current load of the system is less than the load threshold, determining that the system is in an idle state.

In an optional implementation, when a plurality of processes for which memory is to be reclaimed are determined, sending, by the processor 608, a processing instruction to a system kernel includes calling a plurality of threads to send a plurality of processing instructions to the system kernel, where each thread is used to send one or more processing instructions.

In another optional implementation, the determining, by the processor 608, a process for which memory is to be reclaimed from a background process list includes determining, based on ascending order of application importance degrees, at least one application from a plurality of applications included in the background process list, and determining, based on ascending order of process priorities, the process for which memory is to be reclaimed from processes included in the at least one application.

In another optional implementation, the processor 608 is further configured to perform the following operations by calling the program code stored in the memory 602 creating the background process list when the current available memory of the system is less than the memory threshold.

In another optional implementation, the processor 608 is further configured to perform the following operations by calling the program code stored in the memory 602 creating the background process list when the current available memory of the system is less than the memory threshold and that the system is in an idle state.

In another optional implementation, creating, by the processor 608, the background process list includes determining a score of a key element of each application that is currently running in the background, where the key element includes one or more of the following a process priority, a user use habit, a process-occupied system resource, and an application relation, performing weighted calculation on scores of all key elements of each application, to obtain an importance degree of the application, sorting all applications based on importance degrees of all the applications, and sorting, based on process priorities, processes included in each sorted application to generate the background process list.

In the terminal 600 described in FIG. 6, when the current available memory of the system is less than the memory threshold, proactive memory reclamation may be performed. When an application program truly requires a large amount of memory, the system kernel has already reclaimed a large amount of available memory. Therefore, a probability of intermittent stops of the terminal can be reduced.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the descriptions of the embodiments have respective focuses. For a part that is not described in detail in one embodiment, refer to related descriptions in other embodiments.

In the several embodiments provided in this application, it should be understood that the disclosed apparatus may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be implemented in electrical or other forms.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present disclosure essentially, or the part contributing to the other approaches, or all or a part of the technical solutions may be implemented in the form of a software product. The software product is stored in a storage and includes several instructions for instructing a computer device (which may be a personal computer, a server, or a network device) to perform all or a part of the steps of the methods described in the embodiments of the present disclosure. The foregoing storage includes any medium that can store program code, such as a USB flash drive, a ROM, a RAM, a removable hard disk, a magnetic disk, or an optical disc.

A person of ordinary skill in the art may understand that all or some of the steps of the methods in the embodiments may be implemented by a program instructing relevant hardware. The program may be stored in a computer readable storage. The storage may include a flash memory, a ROM, a RAM, a magnetic disk, or an optical disc.

The embodiments of the present disclosure have been described in detail. The principle and implementation of the present disclosure have been clarified herein through specific examples. The description about the embodiments of the present disclosure is merely provided to help understand the method and the core idea of the present disclosure. In addition, a person of ordinary skill in the art can make variations and modifications to the present disclosure in the specific implementations and the application scope based on the idea of the present disclosure. Therefore, the content of the specification shall not be construed as a limitation on the present disclosure.

What is claimed is:

1. A memory reclamation method performed by a system, comprising:
   determining that a memory pressure is present in the system in response to a current available memory of the system being less than a memory threshold, wherein the memory pressure is indicated by a memory pressure value computed based on a difference between the memory threshold and the current available memory of the system;
   obtaining a background process list, wherein the background process list comprises one or more processes of one or more applications;
   computing a target difference value for each of the one or more process, wherein the target difference value is a difference between memory occupied by each of the one or more process and the memory pressure value;
   determining a target process from the background process list in response to an absolute value of a target difference value of the target process being less than a preset threshold; and
   sending an instruction to a system kernel triggering the system kernel to reclaim the memory occupied by the target process.

2. The memory reclamation method of claim 1, wherein before determining that the memory pressure is present in the system, the memory reclamation method further comprises detecting a first key event, and wherein the memory threshold is a first memory threshold corresponding to the first key event.

3. The memory reclamation method of claim 2, wherein the first key event comprises any one of a program start beginning event, a cleanup event, or an out of memory (OOM) event.

4. The memory reclamation method of claim 1, wherein before determining that the memory pressure is present in the system, the memory reclamation method further comprises,
   detecting that the system is in an idle state; and
   detecting a second key event in response to detecting that the system is in an idle state, wherein the memory threshold is a second memory threshold corresponding to the second key event.

5. The memory reclamation method of claim 4, wherein the second key event comprises any one of a program start completed event, a screen-on event, a screen-off event, a screen touch event, a user interface switch event, a task switch completed event, or a broadcast event.

6. The memory reclamation method of claim 1, wherein before determining that the memory pressure is present in the system, the memory reclamation method further comprises;
   detecting that the system is in an idle state; and
   detecting a second key event in response to detecting that the system is in an idle state, wherein the memory threshold is a second memory threshold corresponding to the second key event.

7. The memory reclamation method of claim 1, wherein selecting the target process comprises:
   selecting, based on ascending order of application importance degrees, at least one application from the one or more applications comprised in the background process list; and selecting, based on ascending order of process priorities, the target process from one or more processes comprised in the at least one application.

8. The memory reclamation method of claim 1, further comprising creating the background process list based on application importance degrees for each of the one or more applications.

9. The memory reclamation method of claim 1, wherein obtaining the background process list comprises:
determining a score of a key element of each application currently running in background, wherein the key element comprises at least one of a process priority, a user use habit, a process-occupied system resource, or an application relation;
performing weighted calculation on scores of all key elements of each application to obtain an importance degree of a corresponding application;
sorting all applications based on importance degrees of all the applications; and
sorting, based on process priorities, processes comprised in each sorted application to generate the background process list.

10. The memory reclamation method of claim 1, wherein the system is in an idle state, and wherein the memory reclamation method further comprises creating the background process list based on application importance degrees for each of the one or more applications.

11. A terminal device, comprising:
a memory configured to store a computer executable instruction; and
a processor coupled to the memory, wherein the computer executable instruction causes the processor to be configured to:
determine that a memory pressure is present in the system in response to a current available memory of the system being less than a memory threshold, wherein the memory pressure is indicated by a memory pressure value computed based on a difference between the memory threshold and the current available memory of the system;
obtain a background process list, wherein the background process list comprises one or more processes of one or more applications;
compute a target difference value for each of the one or more process wherein the target difference value is a difference between memory occupied by each of the one or more process and the memory pressure value;
determine a target process from the background process list in response to an absolute value of a target difference value of the target process being less than a preset threshold; and
send an instruction to a system kernel triggering the system kernel to reclaim the memory occupied by the target process.

12. The terminal device of claim 11, wherein before a determination is made that the memory pressure is present in the system, the computer executable instruction further causes the processor to be configured to detect a first key event, and wherein the memory threshold is a first memory threshold corresponding to the first key event.

13. The terminal device of claim 12, wherein the first key event comprises any one of a program start beginning event, a cleanup event, or an out of memory (OOM) event.

14. The terminal device of claim 11, wherein before a determination is made that the memory pressure is present in the system, the computer executable instruction further causes the processor to be configured to;
detect that the system is in an idle state; and
detect a second key event in response to the system being in an idle state, wherein the memory threshold is a second memory threshold corresponding to the second key event.

15. The terminal device of claim 14, wherein the second key event comprises any one of a program start completed event, a screen-on event, a screen-off event, a screen touch event, a user interface switch event, a task switch completed event, or a broadcast event.

16. The terminal device of claim 11, wherein before a determination is made that the memory pressure is present in the system, the computer executable instruction further causes the processor to be configured to:
detect that the system is in an idle state; and
detect a second key event in response to the system being in an idle state, wherein the memory threshold is a second memory threshold corresponding to the second key event.

17. The terminal device of claim 11, wherein the computer executable instruction further causes the processor to be configured to:
select, based on ascending order of application importance degrees, at least one application from the one or more applications comprised in the background process list; and
select, based on ascending order of process priorities, the target process from one or more processes comprised in the at least one application.

18. The terminal device of claim 11, wherein the computer executable instruction further causes the processor to be configured to create the background process list based on application importance degrees for each of the one or more applications.

19. The terminal device of claim 11, wherein the instruction further causes the processor to be configured to:
determine a score of a key element of each application currently running in background, wherein the key element comprises at least one of a process priority, a user use habit, a process-occupied system resource, or an application relation;
perform weighted calculation on scores of all key elements of each application to obtain an importance degree of a corresponding application;
sort all applications based on importance degrees of all the applications; and
sort, based on process priorities, processes comprised in each sorted application to generate the background process list.

20. A non transitory storage medium, comprising computer-readable instructions, that when performed by one or more processors cause the one or more processors to:
determine that a memory pressure is present in the system in response to a current available memory of the system being less than a memory threshold, wherein the memory pressure is indicated by a memory pressure value computed based on a difference between the memory threshold and the current available memory of the system;
obtain a background process list wherein the background process list comprises one or more processes of one or more applications;

compute a target difference value for each of the one or more process, wherein the target difference value is a difference between memory occupied by each of the one or more process and the memory pressure value;

determine a target process from the background process list in response to an absolute value of a target difference value of the target process being less than a preset; and send an instruction to a system kernel triggering the system kernel to reclaim the memory occupied by the target process.

* * * * *

UNITED STATES PATENT AND TRADEMARK OFFICE
CERTIFICATE OF CORRECTION

| | |
|---|---|
| PATENT NO. | : 11,099,900 B2 |
| APPLICATION NO. | : 16/365082 |
| DATED | : August 24, 2021 |
| INVENTOR(S) | : Qibin Yang and Xiaojun Duan |

It is certified that error appears in the above-identified patent and that said Letters Patent is hereby corrected as shown below:

In the Claims

Claim 4, Column 26, Lines 41 and 42: "further comprises," should read "further comprises:"

Claim 6, Column 26, Lines 55 and 56: "further comprises;" should read "further comprises:"

Claim 11, Column 27, Line 48: "more process wherein the" should read "more process, wherein the"

Claim 19, Column 28, Line 65: "process list wherein the" should read "process list, wherein the"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*